INVENTORS
ROBERT J. McKNIGHT
EDWIN W. SWEZEY
BY
Price and Heusveld
ATTORNEYS

2,985,278

SPRING BIASED BELT SUPPORT

Robert J. McKnight, Upper Montclair, and Edwin W. Swezey, Hackensack, N.J., assignors to The Rapids-Standard Company, Inc., Grand Rapids, Mich., a corporation of Michigan Filed Oct. 2, 1958, Ser. No. 764,919

9 Claims. (Cl. 198—160)

This invention relates to article conveyors in general and more particularly to those conveyors having spaced wheeled track sections and an article motivating conveyor belt therebetween.

In many instances it is necessary that article conveyors be adaptable to move articles of different weights. In those conveyors which make use of parallel and spaced wheeled track sections, with a conveyor belt therebetween, efforts have been made to mount the conveyor belt so that it may be vertically adjusted. In so doing its frictional engagement with articles travelling on the track sections may be set as necessary to induce article flow without producing excessive pressure in the event it becomes necessary or desirable to stop the flow of an article or articles without stopping the belt.

Conveyor belt adjustment means have included means whereby the whole belt is adjustable relative to the load bearing level of the adjacent track sections. This is not well suited for use where articles of different weights are being conveyed since the setting must be for the heaviest article or it will depress the belt out of service. Further, except for such heavy articles, the frictional engagement with other articles is more than is needed thus producing excessive end loading pressure if and when an obstacle is interposed in the path of travel of the article or articles.

It is an object of this invention to disclose individual means for yieldingly biasing a power driven conveyor belt in and above the load bearing plane of adjacently disposed conveyor track sections in a manner to accommodate articles of different weights, when required.

It is also an object of this invention to disclose individual conveyor belt biasing means which may be collectively set to obtain a desired frictional engagement between the belt and articles of constant weight being transported thereon.

Another object of this invention is to disclose a form of belt biasing means providing independent belt actuation along the length thereof and precluding any one article or group of articles placing the whole line out of service.

Still another object of this invention is to disclose means for yieldingly biasing the part of the conveyor belt thereover for increased frictional engagement with the heavier articles carried thereby. The heavier articles in attempting to depress the conveyor belt more encounter an increased resistance which affords greater frictional engagement between the belt and the article.

A further object of this invention is to disclose means of belt adjustment which are readily adapted for use on a conveyor and are as easily removable for inspection, repair, relocation and the like.

These and other objects and advantages in the practice of this invention will be more apparent in the illustration and description of a working embodiment of the invention, as hereinafter set forth.

The belt adjustment means of this invention makes use of coiled spring members, in compression, arranged to bias belt carrying wheels into a raised position. The belt carrying wheels are intended to hold the article engaging surface of the power driven conveyor belt above the load bearing surface of adjacently disposed wheeled conveyor or roller track sections. Accordingly, the belt is held in biased and spring loaded frictional engagement with articles disposed thereover, and which are supported on the wheeled or roller track sections, sufficient to carry the articles therewith.

The belt adjustment herein disclosed is to be distinguished from any form of inertial compensation means, such as might be obtained by a counterweighted and pivotal belt elevating means.

Figures 1, 2, 3:
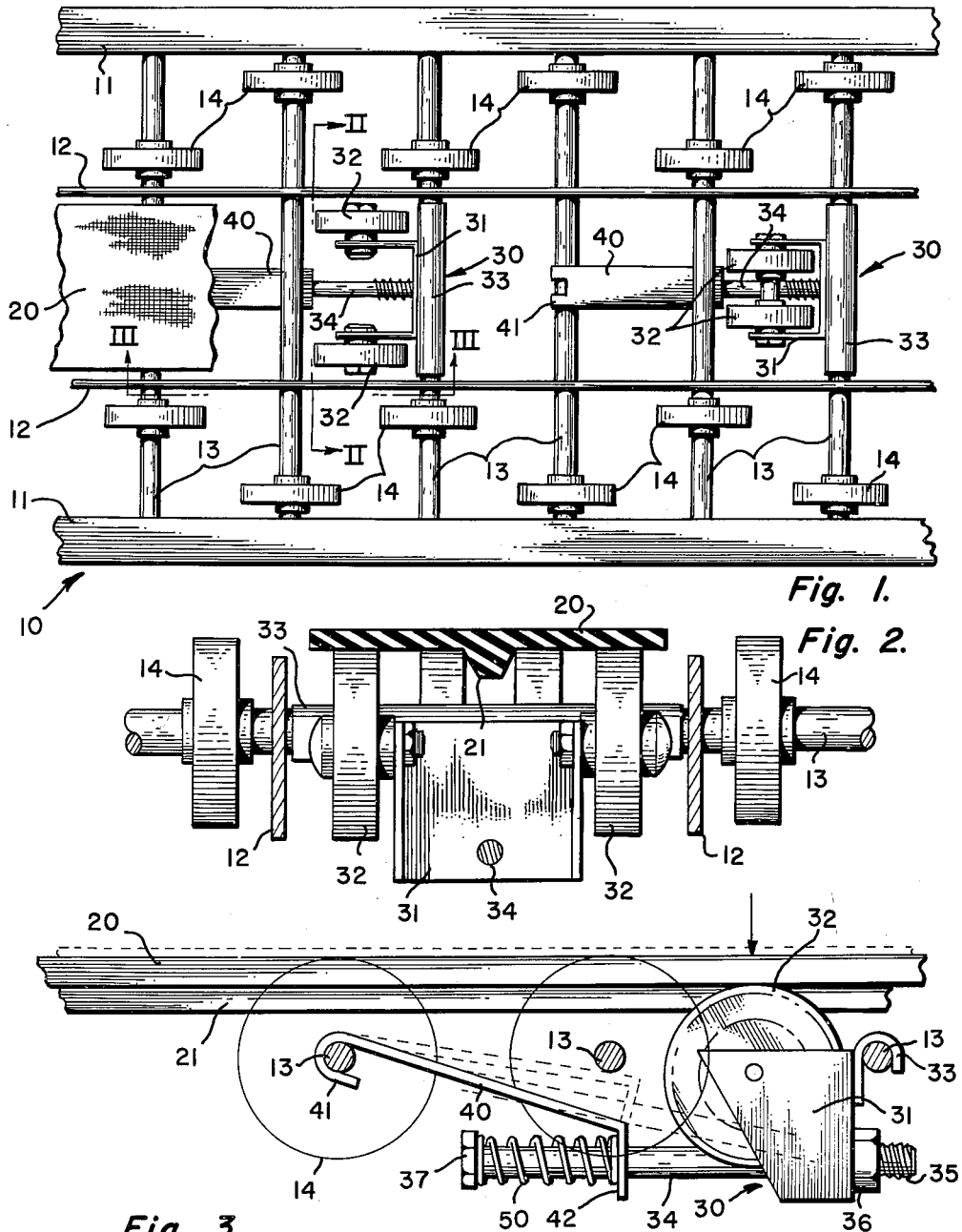
Fig. 1 is a top plan view of a section of an article conveyor including this invention and having part of the conveyor belt removed.
Fig. 2 is an enlarged cross sectional view of the conveyor taken in the plane of line II—II of Fig. 1 and looking in the direction of the arrows.
Fig. 3 is an enlarged cross sectional view of the conveyor taken in the plane of line III—III of Fig. 1 and looking in the direction of the arrows. Certain parts of the conveyor frame are not shown in order to better illustrate the invention.

The article conveyor 10 includes a conveyor frame formed by extended side and intermediate support members 11 and 12 having a plurality of axle shafts 13 disposed thereacross at regular spaced intervals. Conveyor wheels 14 are mounted on the axle shafts 13, between the supports 11 and 12, to provide a given wheel pattern. The wheels 14 and the supports 11 and 12 provide what is referred to as wheeled conveyor track sections.

A conveyor belt 20 is extended between the supports 12 and across the axle shafts 13 which extend therebetween. The conveyor belt 20 may be any moderately flexible member such as a chain, belt, or rope. In this instance a smooth surfaced flat belt is used and is formed to include a rib 21 on its underside which is an aid in guiding the belt on the conveyor frame. The conveyor belt is an endless belt driven by a power source at one end of the conveyor frame, passing over an idler pulley at the other end, and returning under the load bearing surface of the conveyor frame.

The conveyor belt 20 is intended to be disposed in or above the load bearing plane of the track section wheels 14. The belt is held yieldingly biased in such a position by means hereafter described. In this way articles are supported on the wheels 14 and the belt is held in frictional engagement with the underside of the articles as necessary to cause them to travel with the belt.

The means for biasing the conveyor belt 20 in an elevated position above the load bearing plane of the conveyor wheels 14 includes a hanger 30 pivotally engaged at one end on one of the axle shafts 13. The hanger member 30 includes a wheel carrying yoke 31 having belt engaging wheels 32 mounted between or outside of the yoke arms. In practice the wheels 32 are alternately spaced within and outside the yoke arms, in successive devices, to respectively guide the rib 21 and better support the belt 20. This same type of mechanism could be used with a chain or pulley drive by having sprockets or pulleys substituted for the belt engaging wheels.

A saddle 33 is formed as a part of or is secured to the back of the wheel carrying yoke member 31 and provides means of pivotally engaging the hanger 30 to one of the axle shafts 13. The wheels 32 are eccentrically located relative to the pivotal supporting shaft 13 and accordingly tend to drop the hanger and its wheels down and away from the conveyor belt 20. The saddle is preferably of a width just slightly less than the spacing between the center bands so that they serve to restrain lateral movement of the saddle and maintain the belt engaging wheels in the desired position.

A bolt or stud member 34 is provided on the lower portion of the yoke member 31, and eccentrically of the pivotal supporting shaft 13 to which the hanger is engaged. The end of the bolt or stud is threaded, as at 35, and it is engaged with a nut 36 secured to the back of the yoke 31. The stud 34 is thus axially adjustable and can be held in a selected axial position by means of a lock nut or the like.

A hanger support 40 is provided to hold the hanger member 30 with its wheels 32 in engagement with the conveyor belt 20. The hanger support 40 has one of its ends 41 formed for pivotal engagement with another of the axle shafts 13. The other end 42 of the hanger support is bent over and is slidably engaged on the stud 34.

A coiled compression spring 50 is disposed on the bolt or stud 34 between the head 37 provided thereon and the end 42 of the hanger support. The spring 50 is under such compression, with the hanger 30 and support 40 engaged with the spaced axle shafts 13, as to assume the dotted line position shown in Fig. 3. When the conveyor belt 20 is loaded the belt is depressed from the dotted to full line position in Fig. 3. This in turn depresses the belt wheels 32 and pivots the stud 34 downward about its shaft 13. Such motion of the stud 34 decreases the extent of overlap between the support 40 and the stud and places the spring 50 in further compression.

Accordingly, the wheels 32 have an increased resistance to movement sufficient to provide increased frictional engagement with the heavier articles which tend to cause the greater depression of the belt 20.

The hanger support 30 extends under one of the axle shafts 13. Such shaft thus serves as a stop limiting the extent to which the belt wheels 32 can elevate the belt 20.

A conveyor 10 is readily adapted to include the belt biasing means of this invention. Such means are quickly mountable on a conveyor to convert it from a conventional narrow belt powered conveyor to one having a floating belt which is adjustable for desired operating conditions. The devices disclosed may be used throughout an entire conveyor system, in selected sections, or even in short zones of a single conveyor section, depending on the operating requirements of the conveyor system.

The hanger 30, its stud 34, the spring 50, and the hanger support 40 are a unitary subassembly. The spring 50 and the end 42 of the support 40 are assembled on the stud 34 before it is threaded into engagement with the nut 36 on the yoke member 31.

The hanger 30 is mounted on the conveyor frame by having its saddle portion 33 disposed over one of the axle shafts 13, as shown in Fig. 3. The end 41 of the hanger support is then extended under the next adjacent axle shaft 13 and is engaged with the subsequent shaft 13, also as shown in Fig. 3. The stud or bolt 34 is then adjusted to provide the desired compressive force between the head 37 of the bolt and the slidable end 42 of the hanger thereon. This compressive force may be preset if desired. The force imposed is preferably such as will at least draw the hanger arm 40 up and into stop engagement with the interposed axle shaft 13 between the two hanger member supporting shafts 13.

In use, the belt engaging wheels 32 hold the conveyor belt 20 above the load bearing plane of the track section wheels 14. Articles of relatively lightweight will depress the belt 20 only slightly and will have their weight carried principally on the belt. Articles of more weight will depress the belt 20 to within the load bearing plane of the track section wheels. As to such heavier articles, they will all be engaged by the conveyor belt with the same frictional force; namely the force imposed by the biasing spring 50. This force will be sufficient to cause movement of the articles and may be preadjusted for known load conditions so that a minimum motivating force, and no more, is applied. This will enable end pressure loading, when articles are accumulated, to be held to a minimum.

While a preferred embodiment of this invention has been described, it will be understood that other modifications and improvements may be made thereto. Such of these modifications and improvements as incorporate the principles of this invention are to be considered as included in the hereinafter appended claims unless these claims by their language expressly state otherwise.

We claim:

1. A device for biasing an article conveying belt member in frictional engagement with articles received thereover and principally supported by other means, said device comprising; a member having belt engaging means and means of pivotal support offset from said belt supporting means lengthwise of said belt, a support arm including means of pivotal support at one end thereof, and a biasing spring engaged between the other end of said support arm and said member for yieldingly holding said belt engaging means operably disposed.

2. A device for biasing an article conveying belt member in frictional engagement with articles received thereover and supported by other means, comprising; a hanger having belt engaging means and means of pivotal support offset from said belt supporting means lengthwise of said belt, a stud projected from said hanger eccentrically of said means of pivotal support and extended in the direction of said belt engaging means, a support element for said hanger having means of pivotal support for itself at one end and being slidably engaged with said stud at the other end thereof, and spring means engaged between the extended end of said stud and the slidable end of said hanger support thereon, for yieldably biasing said belt engaging means in an operably disposed position.

3. A device for biasing an article conveying belt in frictional engagement with articles received thereover and principally supported by other means, comprising; a hanger having conveyor belt engaging wheels rotatably mounted near one end thereof, said hanger including means of pivotal support near the other end thereof, an adjustable stud engaged with said hanger and projecting eccentrically of said means of pivotal support, a hanger supporting arm including means of pivotal support at one end thereof and means of sliding engagement with said stud at the other end thereof, and a compressible coil spring member received on said stud between the extended end thereof and the end of said support arm slidably engaged therewith, said pivotal supports of said hanger and said support arm being sufficiently spaced apart to compress said spring member and hold said hanger in a biased position with the belt engaging wheels thereof engaged and elevating said conveyor belt.

4. An article conveyor, comprising; a conveyor frame having a conveyor belt mounted thereon, means engaged on said frame for biasing said belt in load bearing frictional engagement with articles to be transported thereby, said belt biasing means including hanger and a support arm each engaged with said conveyor frame at spaced intervals, said hanger and said support arm extending towards each other and in overlapping relation, and a compressible member engaged between the overlapping ends of said hanger and said support arm for biasing said hanger in yieldable biased engagement with said conveyor belt as it travels thereover.

5. An article conveyor, comprising; a conveyor frame having a plurality of cross members provided thereacross and a conveyor belt extended thereover, means mounted on said cross members for biasing said belt in load bearing frictional engagement with articles to be transferred on said conveyor, said belt biasing means including a hanger member having conveyor belt engaging wheels mounted thereon and means of pivotal engagement with one of said cross members offset from said wheels lengthwise of said belt, a hanger supporting arm member having means of pivotal engagement with another of said cross members and extending towards and in overlapping relation to said hanger member, and compressible spring means mounted between the overlapping portions of said hanger and its supporting arm member for yieldingly biasing said belt engaging wheels in a conveyor belt elevating disposition.

6. An article conveyor, comprising; a conveyor frame having a plurality of cross members provided thereacross and a conveyor belt extended thereover, means mounted on said cross members for biasing said belt in load bearing frictional engagement with articles to be transferred on said conveyor, said belt biasing means including a hanger member having conveyor belt engaging wheels mounted thereon and means of pivotal engagement with one of said cross members offset from said wheels lengthwise of said belt, a hanger supporting arm member having means of pivotal engagement with another of said cross members and extending towards and in overlapping relation to said hanger member, and compressible spring means mounted between the overlapping portions of said hanger and its supporting arm member for yieldingly biasing said belt engaging wheels in a conveyor belt elevating disposition, and a cross member of said conveyor frame interposed between the cross members engaged by said hanger and said hanger supporting arm and disposed for engagement by said supporting arm for limiting the extent to which said belt engaging wheels may be raised.

7. An article conveyor, comprising; a conveyor frame having a plurality of cross members provided thereacross and a conveyor belt extended thereover, means mounted on said cross members for biasing said belt in load bearing frictional engagement with articles to be transferred on said conveyor, said belt biasing means including a hanger member having conveyor belt engaging wheels mounted thereon and means of pivotal engagement with one of said cross members offset from said wheels lengthwise of said belt, an axially adjustable stud provided on said hanger member and extended eccentrically of said means of pivotal engagement therefor, a hanger supporting arm member having means of pivotal engagement with another of said cross members, said supporting arm having the extended end thereof slidably engaged with said stud, and a compressible spring member provided on said stud between the ends of said stud and said supporting arm for yieldingly biasing the overlapping ends of said arm and stud apart and thereby yieldingly biasing said belt engaging wheels into a conveyor belt elevating disposition, and a cross member of said conveyor frame interposed between the cross members engaged by said hanger and said hanger supporting arm and disposed for engagement by said supporting arm for limiting the extent to which said belt engaging wheels may be raised.

8. An article conveyor, comprising; a conveyor frame having a plurality of wheel supporting shafts provided thereacross and a conveyor belt extended thereover, a plurality of rotatable wheels mounted on said shafts on each side of said conveyor belt and providing parallel spaced wheeled conveyor track sections, conveyor belt adjustment means mounted on said shafts under said conveyor belt for biasing said belt within and above the load bearing plane of the rotatable wheels of said conveyor track sections, said belt adjustment means including a plurality of separate devices provided at spaced intervals and each including; a hanger having one end pivotally and removably engaged to one of said shafts and a pair of belt engaging wheels mounted thereon and offset from said pivotally mounted end lengthwise of said belt, an axially adjustable stud extended from said hanger eccentrically of the pivotally connected end thereof, a support arm pivotally engaged to a shaft spaced from said hanger supporting shaft, said support arm having its free end slidably engaged on said stud, and a coil spring disposed in compression on said stud between the end thereof and said slidably engaged support arm end for yieldingly biasing said belt engaging wheels into belt elevating disposition, said support arm extending under one of said frame shafts and being limited thereby as to the extent to which said belt engaging wheels may be elevated.

9. In a device for biasing a driven conveyor member upwardly into article supporting position, said articles being supported in part by other non-powered conveying means, the combination comprising: a belt supporting member; said supporting member having a hanger and a support element each being pivotally mounted at its end; said hanger and support element being hingedly joined together intermediate said pivotally mounted ends; belt supporting means mounted on said hanger between its pivotal mounting and its hinged joint to said support element; a spring urging said belt support member to fold upwardly and said belt supporting means into engagement with said conveyor member and elevating said conveyor member.

References Cited in the file of this patent

UNITED STATES PATENTS

| | | |
|---|---|---|
| 1,476,112 | Small | Dec. 4, 1923 |
| 1,776,419 | Dodge | Sept. 23, 1930 |